(12) United States Patent
Eickhoff et al.

(10) Patent No.: US 6,375,921 B1
(45) Date of Patent: Apr. 23, 2002

(54) BUBBLE COLUMN AND THE USE THEREOF

(75) Inventors: Hubertus Eickhoff; Rüdiger Schütte, both of Alzenau (DE)

(73) Assignee: Degussa Huls A.G., Frankfurt am Main (DE)

(*) Notice: Subject to any disclaimer, the term of this patent is extended or adjusted under 35 U.S.C. 154(b) by 0 days.

(21) Appl. No.: 09/576,178

(22) Filed: May 23, 2000

Related U.S. Application Data

(63) Continuation of application No. PCT/EP99/06626, filed on Sep. 9, 1999.

(30) Foreign Application Priority Data

Sep. 23, 1998 (DE) .......................... 198 43 573

(51) Int. Cl.[7] .................. C01B 15/023; F02M 29/04
(52) U.S. Cl. ................. 423/588; 261/114.1; 261/114.3; 422/189; 422/190; 422/191; 423/659
(58) Field of Search .................. 423/659, 588; 422/189, 190, 191; 261/114.1, 114.3

(56) References Cited

U.S. PATENT DOCUMENTS

| 3,073,680 | A | | 1/1963 | Jenney |
|---|---|---|---|---|
| 3,752,885 | A | | 8/1973 | Liebert |
| 3,853,986 | A | | 12/1974 | Blass |
| 4,391,675 | A | | 7/1983 | Lynn |
| 5,601,797 | A | * | 2/1997 | Gentry .................. 423/659 |
| 5,725,837 | A | * | 3/1998 | Turunen .................. 423/588 |

FOREIGN PATENT DOCUMENTS

| DE | 2 003 268 | 7/1971 |
|---|---|---|
| DE | 26 34 785 | 2/1978 |
| DE | 196 47 126 A1 | 5/1997 |
| EP | 0 221 931 B1 | 5/1987 |
| GB | 879539 | 10/1961 |

OTHER PUBLICATIONS

Ullmann's Encyclopedia of Industrial Chemistry, 5th Ed. (1992), vol. B4, pp. 276–278, (no month).
Ullmann's Encyclopedia of Industrial Chemistry, 5th Ed. (1989), vol. A13, pp. 447–457. (no month).

* cited by examiner

Primary Examiner—Wayne Langel
(74) Attorney, Agent, or Firm—Pillsbury Winthrop LLP

(57) ABSTRACT

A bubble column can be operated using countercurrent flow including perforated trays. The space-time yield of gas-liquid reactions can be considerably increased if the perforated trays have a substantially uniform distribution of holes, if the cross-sectional area of the individual holes is 0.003 to 3 $mm^2$, particularly 0.01 to 0.5 $mm^2$, and if the open area of the trays is 3 to 20%, particularly 3 to 10%, and if the bubble column comprises passages for liquid between adjacent liquid zones.

The bubble column can be used for carrying out gas-liquid reactions, such as oxidation reactions with air, with the gas and liquid preferably being passed in countercurrent flow through the column. Cocurrent flow may also be used.

15 Claims, 2 Drawing Sheets

BUBBLE COLUMN AND THE USE THEREOF

CROSS REFERENCE TO RELATED APPLICATIONS

The present application is a continuation of International Application PCT/EP99/06626, filed on Sep. 9, 1999 and claims priority to German application DE 198 435 73.8, filed Sep. 23, 1998, which disclosure is incorporated herein by reference.

FIELD OF THE INVENTION

This invention relates to a bubble column which can be operated using countercurrent flow and comprises horizontally disposed perforated trays in the middle part thereof and the use thereof for carrying out gas-liquid reactions. One use is for the oxidation stage of the anthraquinone process for the production of hydrogen peroxide.

BACKGROUND OF THE INVENTION

Bubble columns are columnar vessels in which a gas in the form of bubbles comes into contact with a liquid, wherein substances are mostly transferred from one phase into the other phase. Accordingly, bubble columns are used for chemical reactions between components in a liquid phase and components in a gaseous phase. In order to intensify mass transfer between the phases and to reduce back-mixing effects, a plurality of perforated trays disposed one above another can also be used in bubble columns (Ullmann's Encyclopedia of Industrial Chemistry 5th Ed. (1992), Vol. 24, 276–278).

The perforated trays of large-scale industrial bubble columns, namely those with a diameter of at least 1 m, are usually sieve plates with a hole diameter between 2 and 5 mm or dual flow trays with a hole diameter of up to 20 mm. Grids with a thin layer of conventional packing material situated thereon are also used instead of sieve plates. The space-time yield of gas-liquid reactions is strongly dependent on the gas content in the gas-liquid mixture flowing through the column. When employing bubble columns with the aforementioned sieve plates, it has not proved possible to increase the gas content above certain limiting values, and the space-time yield has thereby been limited. Therefore, there have been many attempts to increase the space-time yield by means of other built-in components and/or by using special injection means for the gas. However, the construction of bubble columns is made considerably more costly on an industrial scale by the use of the built-in components mentioned above, for instance static mixers.

DE 694 03 618 T2, a translation of EP 0,659,474 B1, teaches a method for bringing a gas current into contact with a liquid phase and teaches a device for this purpose. The device includes a column with perforated sieve plates in which the total surface area of the perforations is between 1/40 and 1/300 of the cross section available for perforations. The level of the liquid layer maintained on the sieve plates, which is adjusted, e.g., by means of weirs, is preferably in a range of 200 to 600 mm. The cross-sectional area of the individual perforations is in a range of 0.5 to 3.5 mm$^2$.

Austrian patent 236,346 teaches specially perforated trays for columns such as those used for distillation methods and absorption methods. In addition to openings having vertical walls, the trays additionally contain a small number of openings with walls inclined at an angle to the main surface. The cross-sectional area of the openings is 0.155 to 31.7 mm$^2$ and, according to the example, the surface is 0.63 mm$^2$.

During operation, a liquid flows over the trays. The patent document does not teach operating the column as a bubble column.

DE-AS 10 28 096 teaches a method for the continuous reaction of finely distributed solid bodies with liquids and/or gases. A column, operated with cocurrent flow, entirely filled with liquid and with sieve plates having perforations with a diameter of less than 1 mm, is used. A gas cushion inhibits the passage of liquid. The column has no devices for enabling countercurrent operation.

The bubble-column cascade reactor according to DE-OS 21 57 737 is essentially the same as the previously evaluated reactor. The entire free perforation area is preferably less than 5% of the reactor cross section and the perforation diameters are, according to the examples, 2 and 4 mm (=3.14 to 12.56 mm$^2$). No suggestions of countercurrent operation and/or devices to this end are disclosed by the document.

One large-scale industrial process based on a gas-liquid reaction is the oxidation stage in the anthraquinone process (AO process) for the production of hydrogen peroxide. As is known, this process comprises a hydrogenation stage, an oxidation stage and an extraction stage—a review is given in Ullmann's Encyclopedia of Industrial Chemistry 5th Ed. (1989), Vol. A13, 447–457. In the hydrogenation stage, a reaction medium which is based on one or more 2-alkylanthraquinones and/or tetrahydro derivatives thereof, and which is dissolved in a solvent system, is partially hydrogenated to form the corresponding hydroquinones and, in the oxidation stage, the hydroquinones contained in the hydrogenated working solution are re-oxidized to quinones by a gas containing $O_2$, generally air, with the formation of hydrogen peroxide. The reaction in the oxidation stage should be as quantitative as possible with the avoidance of decomposition reactions of components of the working solution. Moreover, it should consume as little energy as possible and it should be capable of being conducted with a high space-time yield.

In the AO process, oxidation is first conducted in gasification towers disposed in series, using fresh air in each case. This is both costly on an industrial scale and relatively uneconomic. According to U.S. Pat. No. 3,073,680, the rate of oxidation can in fact be increased by maintaining defined bubble sizes, which can be obtained by means of fine-pored gas distributor elements such as frits, and by maintaining defined conditions of cross-sectional loading. However, problems arise with the separation of the resulting foam and with gas-liquid phase separation.

According to German patent specification 20 03 268, the aforementioned problems associated with the AO process can be solved by means of an oxidation column which is subdivided into two to six sections. In each section of this column, the working solution and the oxidizing gas are passed from the bottom to the top in cocurrent flow, but in the column as a whole the gas and the liquid move in countercurrent flow in relation to each other. In order to achieve intimate mixing, the individual sections contain suitable built-in components such as sieve plates or meshes, or are packed with packing elements.

In an attempt to reduce the pressure drop in the aforementioned cascade-type arrangement of columns, European patent specification 0 221 931 proposes that oxidation be conducted in a tubular cocurrent reactor which contains no built-in components apart from a special gas distributor element. This gas distributor element results in the formation, from the working solution and the oxidizing gas, of a system in which bubbles are inhibited from coalescing and which has a high gas content. If the gas content is too high and/or if the gas bubbles are particularly small, problems can arise with gas-liquid separation. It has been shown in practice that the specific reactor volume to be gasified (in m³ per ton $H_2O_2$) is quite large, which results in a reduced space-time yield and also results in a high hold-up of costly working solution.

SUMMARY OF THE INVENTION

The object of the present invention is to provide a bubble column which can be operated with countercurrent flow and which includes perforated trays with which gas-liquid reactions can be conducted with a higher space-time yield than when using columns comprising customary sieve plates. The bubble column should be of simple construction. A further object is oriented towards the use of the bubble column in the oxidation stage of the AO process for the production of hydrogen peroxide, wherein the conversion is improved compared with known processes, the space-time yield with respect to the reactor volume and the volume of working solution is improved, and the formation of a gas-liquid mixture which is difficult to separate is avoided.

This object is achieved by a bubble column comprising a columnar vessel (1) having a bottom (3), middle (2) and top part (4), one or more perforated trays (5) horizontally disposed in the middle part and with a distribution of holes which is essentially uniform over the cross section of the column, and devices for feeding and discharging a liquid phase (9 and 10) and a gas phase (11 and 12) in order to operate the bubble column with countercurrent flow, which is characterized in that the cross-sectional area of the individual holes is 0.003 to 3 mm², the open area of the trays is 3 to 20% and in that the liquid zones formed in the operating state above and below a tray communicate with each other via a passage (6) for throughflow of liquid.

Compared with bubble columns comprising conventional sieve plates, the bubble columns according to the invention are characterized by trays with fine holes or fine slits. The trays preferably contain holes with a cross-sectional area of 0.01 to 1 mm², particularly 0.05 to 0.05 mm². The open area preferably falls within the range from 3 to 15%, preferably 3 to 10%, most preferably 3 to 7%. The shape of the holes is arbitrary, but the holes are usually of round, triangular to semi-elliptical, or slit-shaped construction. The trays comprising fine holes or fine slits can be constructed as complete column trays, but usually consist of a supporting grid and a plate which is fixed thereon, which comprises fine holes or fine slits and which is of the desired plate thickness and degree of perforation. Plates of this type comprising fine holes or slits are in fact used in sieving and filtration technology and as fluidizing bases in fluidized bed technology. Their use as trays in bubble columns has never been considered previously, however.

As determined by their manufacture, the holes in the plates are preferably of tapered construction in the direction of passage of the gas and/or the holes are inclined in addition for the purpose of achieving a directed flow during passage of the gas. A directed flow can additionally be effected by the scale which is formed on the surface of the plate due to the manufacture thereof.

The bubble column is divided into several zones by the finely perforated trays in the middle part of the bubble column which are filled with liquid or a liquid-gas mixture in the operating state, with the exception of a thin gas cushion directly below the trays. In order that smooth operation is assured during countercurrent operation, the bubble column comprises at least one tubular or well-shaped liquid passage (6) per tray, between adjacent zones, so-called "downcomers". These passages, which advantageously inlet directly on the tray, thus avoiding any need for a weir, dip into the liquid of the zone located below the particular tray or are connected to it. The passages are designed so that no gas flows through them in the operating state. This is achieved, e.g., in that the downcomers, advantageously in the form of round tubes or segment-like wells arranged on the perforated trays with an appropriate free cross section, empty into a dip pocket. Alternatively, outside pipes connecting two adjacent zones at a time can also be used as downcomers.

The bubble column is usually designed in such a manner that it can be operated using countercurrent flow, during which a liquid is discharged at the top and a gas is supplied at the bottom. If the device (6) for the passage of liquid is not present, the bubble column can also be operated using cocurrent flow, during which a mixture of liquid and gas flows upward from below.

The tray interval in the bubble column of the invention is dependent on the specific problem posed and the diameter-to-height ratio of the bubble column. The tray interval is in general in a range of 0.1 to 10 times, especially 0.05 to 5 times the tray diameter. In large-scale industrial bubble columns like those used, e.g., in the use according to the invention for the production of hydrogen peroxide, the tray interval of the trays with fine holes or fine slits is preferably in a range of 0.05 to 2 times the tray diameter.

Aside from the trays discussed above, which are preferably provided, for countercurrent operation, with at least one tubular or well-shaped liquid passage each, the middle part of the column can be free of built-in components. However, according to a preferred embodiment it is also possible to arrange heat exchangers between individual trays, advantageously plate heat exchangers with vertically positioned plates. Such bubble columns provided with trays with fine holes and with heat exchangers can be used with particular advantage to carry out gas-liquid reactions with a high reaction enthalpy. The bubble columns of the invention can be equipped in a manner customary for one skilled in the art for operation using cocurrent or countercurrent flow, preferably countercurrent flow. A cascade design is also possible.

As can be seen from the examples according to the invention and from the comparative examples, extraordinary, unforeseeable advantages are achieved due to the design according to the invention comprising perforated trays in the bubble column:

gasification of a liquid situated above the plates comprising fine holes or slits is extremely uniform;

small bubbles with a narrow range of diameters are produced uniformly over the entire cross-section of the bubble column;

the efficiency of the intensive mass transfer which is due to the trays enables the specific gasification volume (=effective reactor volume) to be reduced compared with bubble columns comprising sieve plates;

the gas content of the gas-liquid mixture which can be attained in practice is significantly greater than the gas content which can be obtained when using conventional sieve plates and in other gasification techniques, without this resulting in problems in gas-liquid phase separation;

the mass transfer area, and the extent of mass transfer which is achieved therewith, is very high;

compared with conventional columns, the hold-up of the liquid phase is significantly reduced; in particular, this is a considerable advantage if the liquid phase is a costly multi-component mixture, for instance the working solution of the AO process;

a higher reaction conversion is achieved per m³ of reactor volume compared with competing processes;

a higher reaction conversion is achieved per m³ of liquid phase (e.g. the working solution in the AO process);

the pressure drop across the trays is about 300 to 500 Pa (3–5 mbar) per tray, and is therefore low compared with the hydrostatic pressure drop in the column; a gas cushion with a depth of only 1 to 5 cm is formed under the trays, so that practically the complete apparatus volume (=the middle part of the column) can be utilized for the reaction.

BRIEF DESCRIPTION OF THE DRAWINGS

FIG. 2(b) shows an enlarged detail of FIG. 2a.

DETAILED DESCRIPTION OF THE PREFERRED EMBODIMENTS

Figure 1:
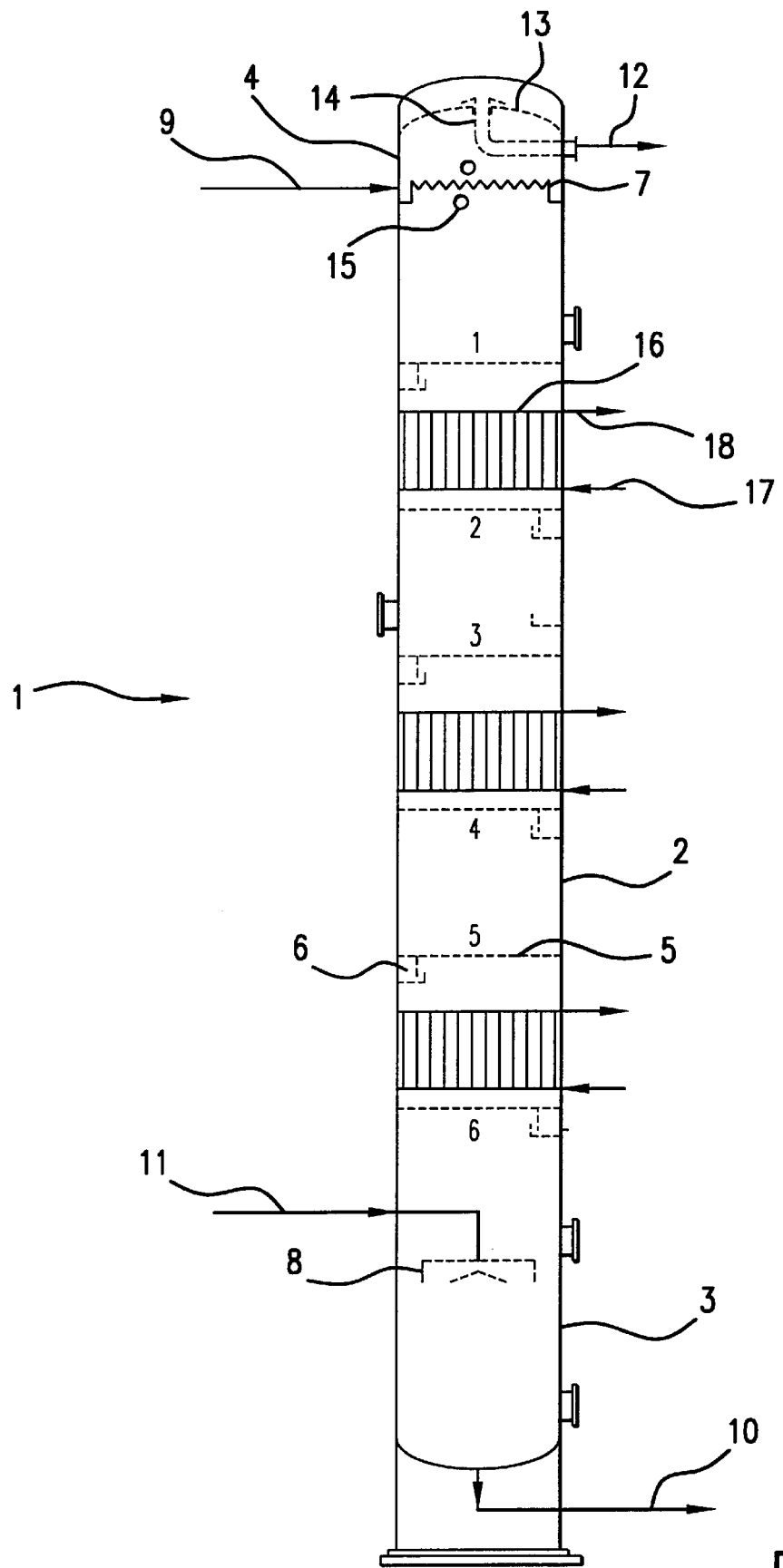
FIG. 1 shows, schematically, a bubble column according to the invention.

FIG. 1 is a schematic illustration of a preferred bubble column 1 according to the invention, which is particularly suitable for countercurrent flow operation and which in its middle part 2 contains three heat exchangers 16 in addition to six trays 5 comprising fine holes. Apart from the gasified middle part 2, the column comprises a bottom part 3 with a cap-shaped gas distributor device 8 and a top part 4 with a device 7 for distributing the liquid phase and a gas-liquid separation device connected to 14. A well-shaped element 6 in the shape of a segment for the passage of liquid is disposed on each finely perforated tray 5 in the zone below the tray. The liquid phase is supplied via line 9 at the top of the column and is discharged via line 10 at the bottom part. The gas is supplied via line 11 to the gas distributor device 8, from which fine gas bubbles emerge. After passing through the column, the gas is separated from the liquid phase in the gas separation device, which is schematically illustrated as a centrifugal separator here, and is discharged as an off-gas via line 12. It is possible to check whether foam has been formed in the region of the column top by means of the sight glasses 15. The flow and return lines 17, 18 of each heat exchanger supply the heat exchanger with a heat transfer medium.

Figure 2B:
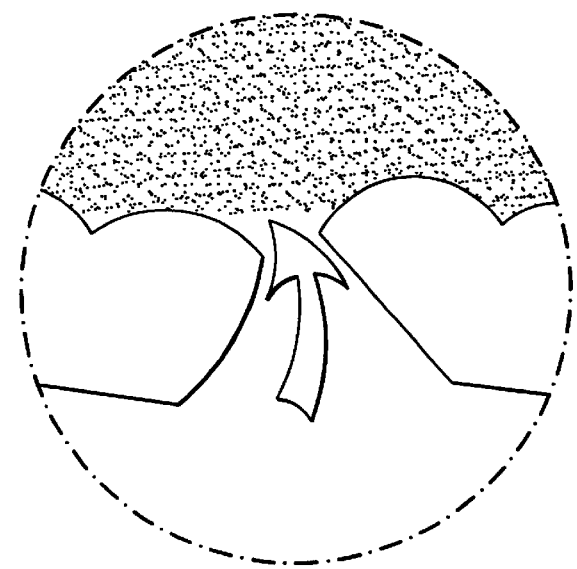
Figure 2A:
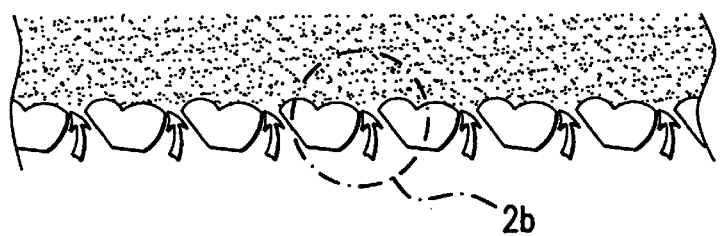
FIG. 2(a) shows, schematically, a cross-sectional view of a tray of the invention.

FIGS. 2(a) and 2(b) show a typical cross-sectional view of a perforated tray of the invention, showing that the holes or slits in the tray may be tapered to facilitate flow therethrough.

Figure 3A:
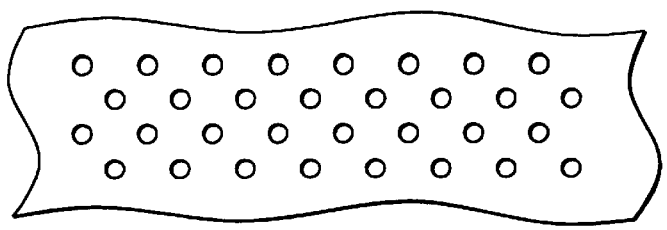
FIG. 3(a) shows, schematically, a top plan view of one embodiment of holes in a tray.
Figure 3B:
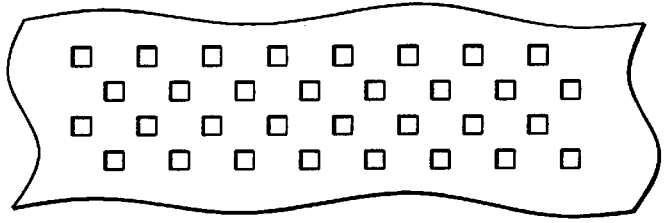
FIG. 3(b) shows, schematically, a top plan view of a second embodiment of holes in a tray.
Figure 3C:
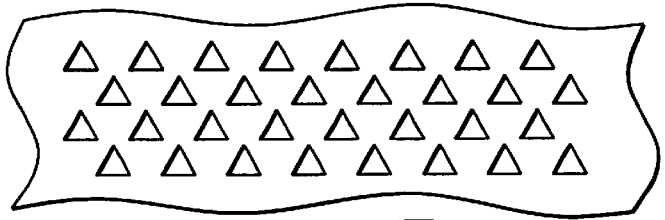
FIG. 3(c) shows, schematically, a top plan view of a third embodiment of holes in a tray.
Figure 3D:
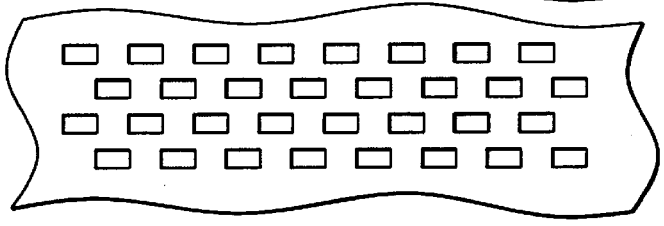
FIG. 3(d) shows, schematically, a top plan view of a fourth embodiment of holes in a tray.

FIGS. 3(a), 3(b), 3(c) and 3(d) show non-limiting examples of alternative shapes and arrangements of holes or slits in the perforated trays. Other arrangements and shapes will be known to one skilled in the art. FIG. 3(a) shows circular holes. FIG. 3(b) shows holes that are semi-elliptical. FIG. 3(c) shows triangular holes and FIG. 3(d) shows elongated slits.

The bottom and top parts of the bubble column can be designed in any desired manner. In particular, customary units can be incorporated for supplying a gas and a liquid and for phase separation.

The bubble column according to the invention can be used for carrying out reactions between a component of a gas phase and a component of a liquid phase. Gas-liquid reactions such as these can comprise oxidation, reduction, addition or neutralization reactions, for non-limiting example, the liquid phase can be aqueous or organic. During the reaction, the two phases can be brought into contact with each other in cocurrent flow or in countercurrent flow, preferably in countercurrent flow, in the bubble column. At the same time, a plurality of bubble columns can be connected in series in the form of a cascade. Apart from one or more reaction components, the liquid phase can additionally contain a catalyst in dissolved or suspended form. When substances are suspended in the liquid phase, their particle diameters must be significantly smaller than the diameter of the holes in the trays comprising fine holes or fine slits.

According to one preferred use, the bubble column according to the invention is employed in the oxidation stage of the anthraquinone process for the production of hydrogen peroxide. The liquid phase is a hydrogenated working solution which contains one or more reaction media from the 2-alkylanthrahydroquinone and 2-alkyltetrahydroanthrahydroquinone series, and the gas phase is an oxygen-containing gas such as air, oxygen, or an oxygen-air mixture. The two phases are preferably brought into contact in countercurrent flow for oxidation, wherein the gas phase is supplied by means of a customary gas distributor device disposed in the bottom part of the bubble column, for example a perforated cap, and the liquid phase is supplied in the top part by means of a customary liquid distributor device. Distribution of the liquid is preferably effected by irrigating a considerable part of the column cross-section. This procedure makes it possible reliably to avoid problems of foaming at the top of the bubble column, such as the problems which occur when using other types of bubble columns, particularly columns disposed in cascade which are described in the prior art, and which can result in losses of working solution due to the discharge thereof with the oxidation off-gas.

Moreover, by using a bubble column according to the invention which comprises integrated heat exchanger plates, it is possible to conduct the oxidation stage almost isothermally. This has a positive effect on the reaction conversion. Furthermore, it also avoids the need to remove working solution from the oxidation stage for the purpose of external cooling. As is shown in the following examples and comparative examples, a considerably higher space-time yield is achieved in the process for the production of hydrogen peroxide by employing a bubble column according to the invention in the oxidation stage. It has been shown that this increase is possible even if the process is operated at a low temperature and under a reduced pressure. By keeping the conditions of temperature and pressure constant, it is thus possible to obtain a further increase in space-time yield. As an alternative to increasing the space-time yield, or in addition thereto, the cost of compressing the oxidizing air can be minimized and a saving in energy can thus be achieved.

Apart from their use as reaction columns, bubble columns comprising separating trays according to the invention can also be used for rectification, absorption and desorption processes. Due to the uniform gas distribution, to the small bubbles and, if need be, to the directed gas flow from the fine holes, very good rates of mass transfer and high extents of loading are possible.

EXAMPLES 1 TO 3

The oxidation stage of the anthraquinone process for the production of hydrogen peroxide was conducted in a large-scale industrial bubble column, using a bubble column according to the invention, as shown in FIG. 1, and using air as the oxidizing gas. The working solution (WS) contained, as the reaction medium, a mixture stemming from many years of operation based on 2 ethyl- and 2-amylanthraquinone and on the tetrahydroanthraquinones thereof in a solvent mixture which was essentially based on an aromatic petroleum compound and tetrabutylurea.

The bubble column comprised six trays with fine holes, which had a cross-sectional area of about 0.05 mm$^2$/hole and an open area of about 5%, three plate heat exchangers, a cap-shaped perforated gas distributor device, an irrigation device at the top of the column and a centrifugal separation device for phase separation at the top of the column.

The essential operating data and the results of Examples 1 and 2 are given in Table 1. Data in Example 3 were obtained from an assessment trial and are given in Table 2 by comparison with corresponding data from Comparative Examples 1 and 2.

TABLE 1

|  | Example 1 | Example 2 |
|---|---|---|
| Volume flow of WS fed into the oxidation stage (m$^3$ WS per hour per m$^3$ of gasified reactor volume) | 1.64 | 1.63 |
| Volume flow of oxidizing air fed in (m$^3_N$ per hour per m$^3$ of gasified reactor volume) | 72.6 | 75.4 |
| Temperature (° C.) of WS in the column: | | |
| inlet | 51.2 | 52.5 |
| middle | 51.2 | 52.5 |
| outlet | 51.2 | 52.5 |
| Overpressure of oxidizing air fed in (bar) | 2.72 | 2.26 |
| O$_2$ in off-gas (% by volume) | 5.6 | 6.3 |
| H$_2$O$_2$ equivalents in WS before oxidation (g/l) | 11.45 | 11.54 |
| H$_2$O$_2$ equivalents in WS after oxidation (g/l) | 11.34 | 11.30 |

WS = working solution

COMPARATIVE EXAMPLE 1

Oxidation of a hydrogenated working solution was conducted in an installation according to EP-B 0 221 931, i.e. the oxidizing gas and the working solution were mixed directly by means of a mixer element and were introduced into the bottom part of a column which was free from built-in components and which constituted a system in which bubble coalescence was inhibited. The working solution used in this operation contained a reaction medium based on 2-ethylanthraquinone and 2-ethyltetrahydroanthraquinone in a solvent mixture with the same basis as that used in Example 1.

The essential operating data, and the space-time yield with respect to 1 m$^3$ of working solution, are given in Table 2. The gas content and the space-time yields of the gas-liquid mixture were less than those in Example 3 according to the invention.

COMPARATIVE EXAMPLE 2

A working solution analogous to that of Comparative Example 1 was oxidized with air in a three-stage cascade according to DE 20 03 268. Each of the three bubble columns contained a sieve plate with a hole diameter of 3 mm in the middle part of the column. The essential operating data and the space-time yields are given in Table 2. The gas content and the STY were less than those in Example 3 according to the invention. See Table 2.

TABLE 2

Data from the comparative assessment trials included oxidation according to the invention (Example 3), oxidation using a bubble column according to Comparative Example 1, and a 3-stage cascade according to Comparative Example 2.

|  | Example 3 | Comparative Example 1 | Comparative Example 2 |
|---|---|---|---|
| Specific gasified volume (1) per ton per year of H$_2$O$_2$ capacity | 6.5 | 9.1 | 7.5 |
| Pressure in bottom part (gas inlet) (bar) overpressure | 2.7 | 2.8 | 2.9 |
| Temperature (° C.) of the WS at the outlet | 51 | 59 | 56 |
| Gas content (%) in gas-liquid mixture | 50 | 45 | 41 |
| Residual O$_2$ (% by volume) | 5.6 | 6.5–7 | 6.5–7 |
| Space-time yield (kg H$_2$O$_2$/h/m$^3$ reactor) | 18.2 | 13.0 | 15.9 |
| kg H$_2$O$_2$/h.m$^3$WS | 36.0 | 23.9 | 27.0 |

WS = working solution

What is claimed is:

1. A bubble column comprising a columnar vessel (1), arranged in a vertical manner, having:
   (a) a bottom part (3), a middle part (2) and a top part (4), wherein:
      (i) the bottom part comprises the gas phase inlet and liquid phase outlet; and
      (ii) the top part comprises the liquid phase inlet and the gas phase outlet;
   (b) one or more perforated trays (5) horizontally disposed in the middle part with a distribution of holes which is essentially uniform over the cross section of the column, wherein:
      (i) the cross-sectional area of each of the said holes is 0.003 to 3 mm$^2$;
      (ii) the open area of trays formed by said holes is 3 to 20%; and
      (iii) liquid zones formed in the operating state above and below a tray communicate with each other via a passage (6) for the throughflow of liquid; and
   (c) devices for feeding and discharging a liquid phase (9, 10) and gas phase (11, 12), said devices being arranged for operating the bubble column with countercurrent flow.

2. The bubble column according to claim 1, wherein:
   the holes have a cross-sectional area of 0.01 to 0.05 mm$^2$, and the open area of the trays is 3 to 7%.

3. The bubble column according to claim 1, wherein:
each tray is provided with at least one tubular or well-shaped passage for passing liquid into a zone located below each said tray, said passage comprising a tube emptying into a dip pocket or a segment-like well.

4. The bubble column according to claim 3, wherein:
the holes are tapered in a direction of liquid passage.

5. The bubble column according to claim 3, wherein the holes are inclined for the purpose of achieving a directed flow.

6. The bubble column according to claim 1, wherein:
the holes are of round, triangular, semi-elliptical, or slit-shaped construction.

7. The bubble column according to claim 1, wherein:
tray spacing in the bubble column middle part is in a range from 0.1 to 10 times the tray diameter.

8. The bauble column according to claim 7, wherein the tray spacing is in a range from 0.5 to 5 times the tray diameter.

9. The bubble column according to claim 1, wherein one or more heat exchangers, are disposed in the middle part of the column.

10. The bauble column according to claim 9, wherein the one or more heat-exchangers comprise plate heat-exchangers having vertically positioned plates.

11. A method of using the bubble column according to claim 1 for carrying out gas-liquid reactions, comprising passing gas and liquid through the column with countercurrent flow.

12. The method according to claim 11, wherein the gas-liquid reaction is an oxidation stage of an anthraquinone process for production of hydrogen peroxide, wherein the liquid phase is a hydrogenated working solution and the gas phase is an oxygen-containing gas.

13. The method according to claim 12, wherein the oxygen-containing gas comprises air.

14. The method according to claim 12, comprising supplying the $O_2$-containing gas using a gas distributor device disposed in the bottom part of the bubble column, and supplying the working solution to the top part of the bubble column by a liquid distributor device.

15. The method according to claim 14, wherein the gas distributor device comprises a perforated cap.

* * * * *